W. A. TURNER.
PIPE COUPLING.
APPLICATION FILED FEB. 19, 1907.

954,549.

Patented Apr. 12, 1910.

Witnesses:
C. F. Nisson
E. M. Allen

Inventor:
W. A. Turner.
By Attorneys
Southgate & Southgate

UNITED STATES PATENT OFFICE.

WILLIAM A. TURNER, OF PROVIDENCE, RHODE ISLAND, ASSIGNOR OF ONE-HALF JOSEPH C. HARTWELL, OF PROVIDENCE, RHODE ISLAND.

PIPE-COUPLING.

954,549.  Specification of Letters Patent.  Patented Apr. 12, 1910.

Application filed February 19, 1907. Serial No. 358,204.

*To all whom it may concern:*

Be it known that I, WILLIAM A. TURNER, a citizen of the United States, residing at Providence, in the county of Providence and State of Rhode Island, have invented a new and useful Pipe-Coupling, of which the following is a specification.

The object of this invention is to provide a new and improved union or coupling for pipes.

The principal objects of the invention are to construct a union or coupling having means whereby the two pipes to be connected may be clamped together at a slight angle, if desired, in such manner as to produce a tight joint, and to provide means whereby when the seat of the joint becomes worn or is injured in any way, the same may be replaced at small expense without discarding the entire coupling.

Further objects and advantages of the invention will appear hereafter.

Figure 1:
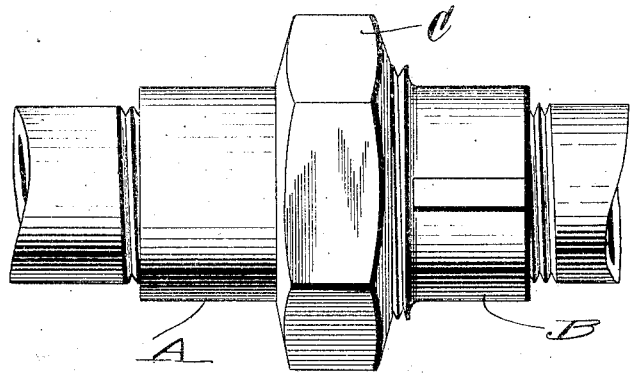
Figure 2:
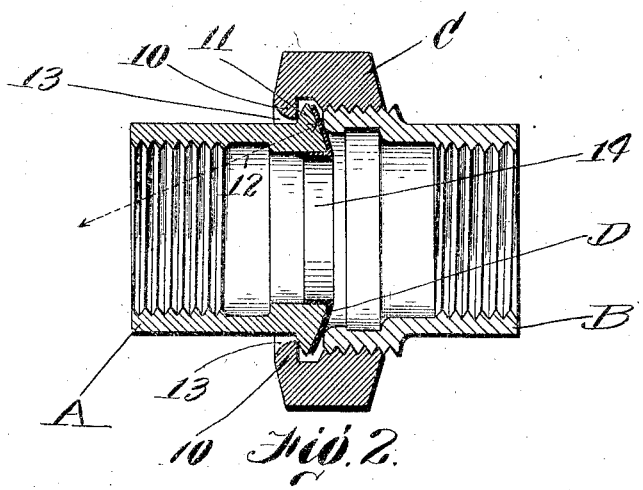
Figure 3:
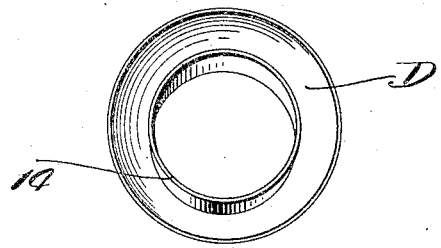

Referring to the accompanying drawing, Figure 1 is a side elevation of a coupling constructed in accordance with my invention. Fig. 2 is a central sectional view of the same, and Fig. 3 is a perspective view of one of the elements thereof.

In some of the best forms of coupling now on the market, brass ringed seats are cast or forced into the iron members. When these couplings are used in steam or hot water lines, the seats are liable to derangement owing to expansion and contraction, and owing to the fact that the pipes sometimes have to be set at slight angles which necessitates replacement by an entire new coupling, as the seats cannot be renewed in such coupling so as to make a tight joint. Some of these couplings have heretofore been made with spherical joints, and others with metallic gaskets, but those which have been provided with gaskets have been so constructed, so far as I am aware, that the gaskets frequently get lost, and great care is required in the installation of the union to prevent such loss, and this of course takes considerable time.

The invention relates to a coupling devised to overcome these difficulties with which the pipes may be coupled together out of alinement with each other without affecting the tightness of the joint, and which comprises a removable seat which can be readily replaced by a new one when worn or injured in any way, whereby the main elements of the coupling may be used indefinitely, and which retains all the virtues of the present ground-joint union without requiring any grinding of the joints in manufacture, and without requiring any brass or copper inserts except a gasket which is simply stamped out of sheet metal. This results in greatly cheapening the present cost of manufacture as well as the cost of setting up such pipe couplings.

Referring to the drawing, designates one member and B the other member of a coupling. The pipes to be connected are screwed into these members, a nut C being first fitted over the member A. The nut is screw-threaded onto the member B and is provided with a flange 10 which engages a flange 11 formed on the member A. The outer surface of the flange 10 is formed in spherical shape, as with a radius 12, so that when the convex annular edge of the member B is drawn against the member A by the nut C, a perfect contact will be made between the member A and the seat on the member B even if the two pipes are out of line. The rear edge of the flange 11 is curved so that the flange 10 of the nut C will engage the same as nearly as possible, even if the two pipes are set at an angle, the outer edge of the flange 10 of the nut C being chamfered away as at 13 for this purpose.

D designates a removable cap or gasket which is struck up out of sheet metal, preferably out of copper. The same constitutes an outer rim which is shaped to fit accurately to the spherical surface of the member A, and the same has extending means which can fit into the member A, which means preferably is formed by making the cap D with an inwardly projecting annular flange 14. This cap D is placed in position before the coupling is screwed together, by inserting the flange 14 into the member A.
The coupling is then screwed up, when the end of the member B will engage the cap and will form a perfect joint therewith, even if the pipes are set at a slight angle to each other. The flange 14 extending into the member A, prevents the cap from wrinkling or from being displaced, as the coupling is tightened up.

If the coupling should leak or if it should be desired to replace the seat, all that is necessary is to unscrew the nut C, pull the members A and B apart, remove the old cap and insert a new cap. In this way, if a cap should become worn or damaged, it may be removed and replaced by a new one without replacing any of the other parts.

The cap D can be economically manufactured by striking the same up out of sheet metal.

Various modifications of my invention can be made by a skilled mechanic without departing from the scope of my invention as expressed in the claim.

Having thus fully described my invention, what I claim and desire to secure by Letters-Patent is:—

As an article of manufacture, a pipe coupling comprising a coupling member having a convex spherical bearing surface on the end thereof, a sheet metal cap or gasket having a convex outer wall fitting said spherical bearing surface and an inwardly projecting cylindrical flange fitting inside the coupling member forming means for holding the cap or gasket on said member when the coupling is uncoupled, and a second coupling member having a transversely curved annular edge adapted to fit tight on the convex surface of the flange in all angular positions thereof.

In testimony whereof I have hereunto set my hand, in the presence of two subscribing witnesses.

WILLIAM A. TURNER.

Witnesses:
THOMAS F. FARRELL,
JOHN L. CASEY.